US008654995B2

(12) United States Patent  (10) Patent No.: US 8,654,995 B2
Silber et al.  (45) Date of Patent: Feb. 18, 2014

(54) AUDIO CONTROL SYSTEM FOR A VEHICLE

(75) Inventors: Michael W. Silber, Dix Hills, NY (US); Aaron L. Butters, Thousand Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 1165 days.

(21) Appl. No.: 11/788,234

(22) Filed: Apr. 19, 2007

(65) Prior Publication Data

US 2008/0226101 A1  Sep. 18, 2008

Related U.S. Application Data

(60) Provisional application No. 60/918,508, filed on Mar. 16, 2007.

(51) Int. Cl.
*H04H 60/04* (2008.01)
*H04R 27/00* (2006.01)
*H04N 11/00* (2006.01)
*H04R 29/00* (2006.01)

(52) U.S. Cl.
USPC ............... 381/123; 381/81; 381/85; 381/86; 381/77; 381/56; 381/58

(58) Field of Classification Search
USPC ........ 381/86, 123, 120, 56, 58, 77, 80, 81, 85
See application file for complete search history.

(56) References Cited

U.S. PATENT DOCUMENTS

| | | | |
|---|---|---|---|
| 4,390,746 A * | 6/1983 | Higashiyama et al. | 381/7 |
| 5,243,640 A * | 9/1993 | Hadley et al. | 455/426.1 |
| 6,778,073 B2 * | 8/2004 | Lutter et al. | 340/435 |
| 6,920,086 B1 | 7/2005 | Sommer et al. | |
| 7,039,205 B1 * | 5/2006 | Carter et al. | 381/123 |
| 7,457,423 B2 * | 11/2008 | Lazzeroni et al. | 381/86 |
| 7,765,046 B2 * | 7/2010 | Takimoto et al. | 701/36 |
| 2003/0133582 A1 | 7/2003 | Niederdrank | |
| 2007/0078543 A1 * | 4/2007 | Wakefield | 700/94 |
| 2008/0219480 A1 * | 9/2008 | Hopkins | 381/123 |

FOREIGN PATENT DOCUMENTS

| | | |
|---|---|---|
| DE | 100 65 772 A1 | 7/2002 |
| DE | 100 65 826 A1 | 7/2002 |
| EP | 1 460 769 A1 | 9/2004 |

OTHER PUBLICATIONS

Published advertisement entitled "Blaupunkt Debuts Plug and Play Car Audio Amplifier Technology at 2007 CES," dated Jan. 8, 2007.
Product advertisement entitled, "JL Audio Integrate, CleanSweep OEM Interface Products," dated prior to Apr. 19, 2007.
European Search Report issued in related European Patent Application No. 08004782.2.

* cited by examiner

*Primary Examiner* — Duc Nguyen
*Assistant Examiner* — George Monikang
(74) *Attorney, Agent, or Firm* — Brooks Kushman P.C.

(57) ABSTRACT

An audio control system may receive a plurality of audio input signals. A switch or multiplexer may switch one of the plurality of audio input signals from respective audio sources to a power amplifier. A controller in communication with the multiplexer may control switching of the multiplexer. A display may provide the user with information regarding the switching of the audio signal inputs. A user interface may permit the user to manually switch the audio source. A signal detector in communication with an audio input signal may detect a signal from a priority source. When the signal from the priority source is detected, the controller may direct the multiplexer to route the signal from the priority source to the power amplifier.

16 Claims, 10 Drawing Sheets

AUDIO CONTROL SYSTEM FOR A VEHICLE

PRIORITY CLAIM

This application claims the benefit of priority from U.S. Provisional Application No. 60/918,508, filed Mar. 16, 2007, which is incorporated by reference.

BACKGROUND OF THE INVENTION

1. Technical Field

This disclosure relates to an audio control system. In particular, this disclosure relates to an audio control system for a vehicle.

2. Related Art

Users may wish to upgrade factory-installed audio systems. Users may replace or upgrade the amplifiers associated with the factory-installed radios and CD players rather than replacing an original radio or CD player. Users sometimes attach additional devices or "sources" to the vehicle's audio system. Such sources may include navigation systems, cellular or wireless telephones, AM-FM radios, satellite radios, MP3-based players, DVD players and other devices.

It may be expensive and difficult to remove and replace existing factory-installed equipment. Dashboard modification and/or cosmetic changes may be required to accommodate new devices. Replacement devices may not fit in an existing dashboard resulting in less than a perfect appearance. Decorative face plates configured to hide poor fitting devices may not provide a professional or factory-installed look. Therefore, a need exists for an audio control system that can manage and control multiple audio sources without impacting the appearance of the vehicle's dashboard.

SUMMARY

An audio control system may receive a plurality of audio input signals. A switch or multiplexer may switch one of the plurality of audio input signals from respective audio sources to a power amplifier. A controller in communication with the multiplexer may control switching of the multiplexer. A display may provide the user with information regarding the switching of the audio signal inputs. A user interface may permit the user to manually switch the audio source. A signal detector in communication with an audio input signal may detect a signal from a priority source. When the signal from the priority source is detected, the controller may direct the multiplexer to route the signal from the priority source to the power amplifier.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
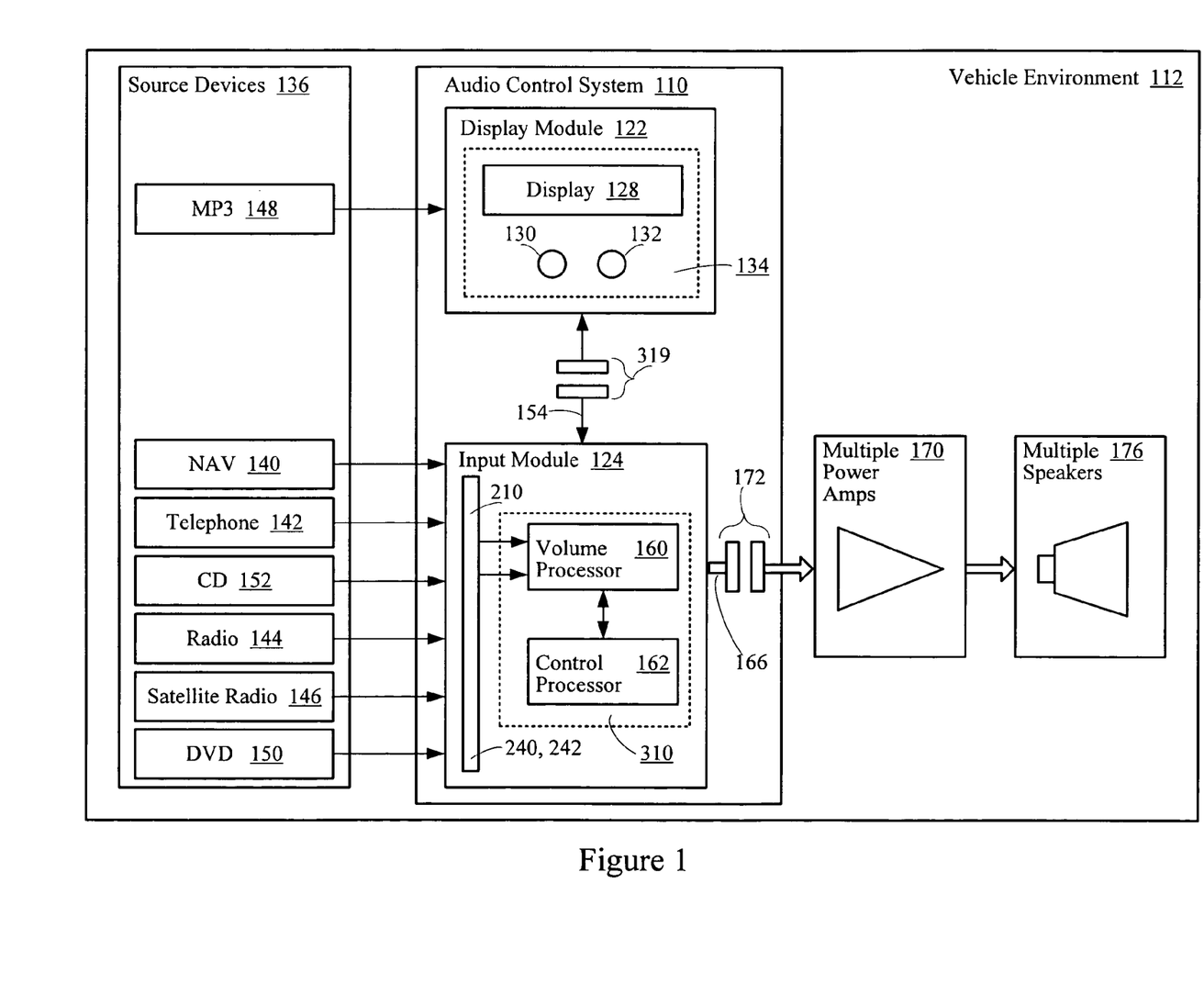
FIG. 1 shows a block diagram of the audio control system.

FIG. 1 is a block diagram of an audio control system 110. The audio control system 110 may be installed in a vehicle environment 112. The audio control system 110 may include a display module 122 and an input module 124. The display module 122 may include an LCD display 128, a volume control 130 and an input control 132. The display module 122 may be mounted or integrated within a dashboard or cluster of the vehicle 112 and may provide a user interface 134. The display module 122 may be used in addition to original equipment manufacturer (OEM) devices, and may provide all of the user controls and visual output to the user. Accordingly, removal and/or modification of the existing OEM devices may not be necessary.

The LCD display 128 may include backlighting and dimming capability. However, any suitable display device may be used, such as a flat panel display or an electro-luminescent display. The display module 122 may have a body formed of molded plastic to present an aesthetically pleasing appearance. The volume control 130 may provide user-adjustable volume settings and power on/off functions. The input control 132 may provide system set-up functions, input labeling and input switching functions for each of a plurality of audio signal sources 136 through a command line interface, menu driven interface, and/or graphical user interface.

The display module 122 may communicate with the input module 124. The input module 124 may be mounted in an enclosed area of the vehicle 112, such as in the trunk, kick panel, behind the dashboard, below a seat, etc. The input module 124 may receive analog audio signals from the various source devices 136. Such source devices 136 may include a navigation system 140, a cellular or wireless telephone 142, an AM-FM radio 144, a satellite radio 146, an MP3-based player 148, DVD player 150 and CD player 152. Other source devices may also be selected by the user.

The input module 124 may control switching of the various source devices 136 through commands from the display module 122. A wiring harness 154, which may be a unitary multi-wire cable, having connector hardware, may interface the display module 122 with the input module 124. Because a wiring harness 154 may be used, the display module 122 may be mounted near or on the dashboard of the vehicle 112 without diminishing its appearance. The display module 122 may control setting the input voltage levels and gain parameters for the audio control system 110 during installation, or through a user-selectable calibration process. The process may ensure compatibility between the various source devices 136 and the input module 124. The input module 124 may further include a volume processor 160 and a control processor 162. The input module 124 may provide audio output signals 166 to multiple power amplifiers 170 through an output connector block 172. The power amplifiers 170 may drive a plurality of vehicle loudspeakers 176.

The display module 122 may communicate with the input module 124. The input module 124 may be mounted in an enclosed area of the vehicle 112, such as in the trunk, kick panel, behind the dashboard, below a seat, etc. The input module 124 may receive analog audio signals from the various source devices 136. Such source devices 136 may include a navigation system 140, a cellular or wireless telephone 142, an AM-FM radio 144, a satellite radio 146, an MP3-based player 148, DVD player 150 and CD player 152. Other source devices may also be selected by the user.

Figure 2:
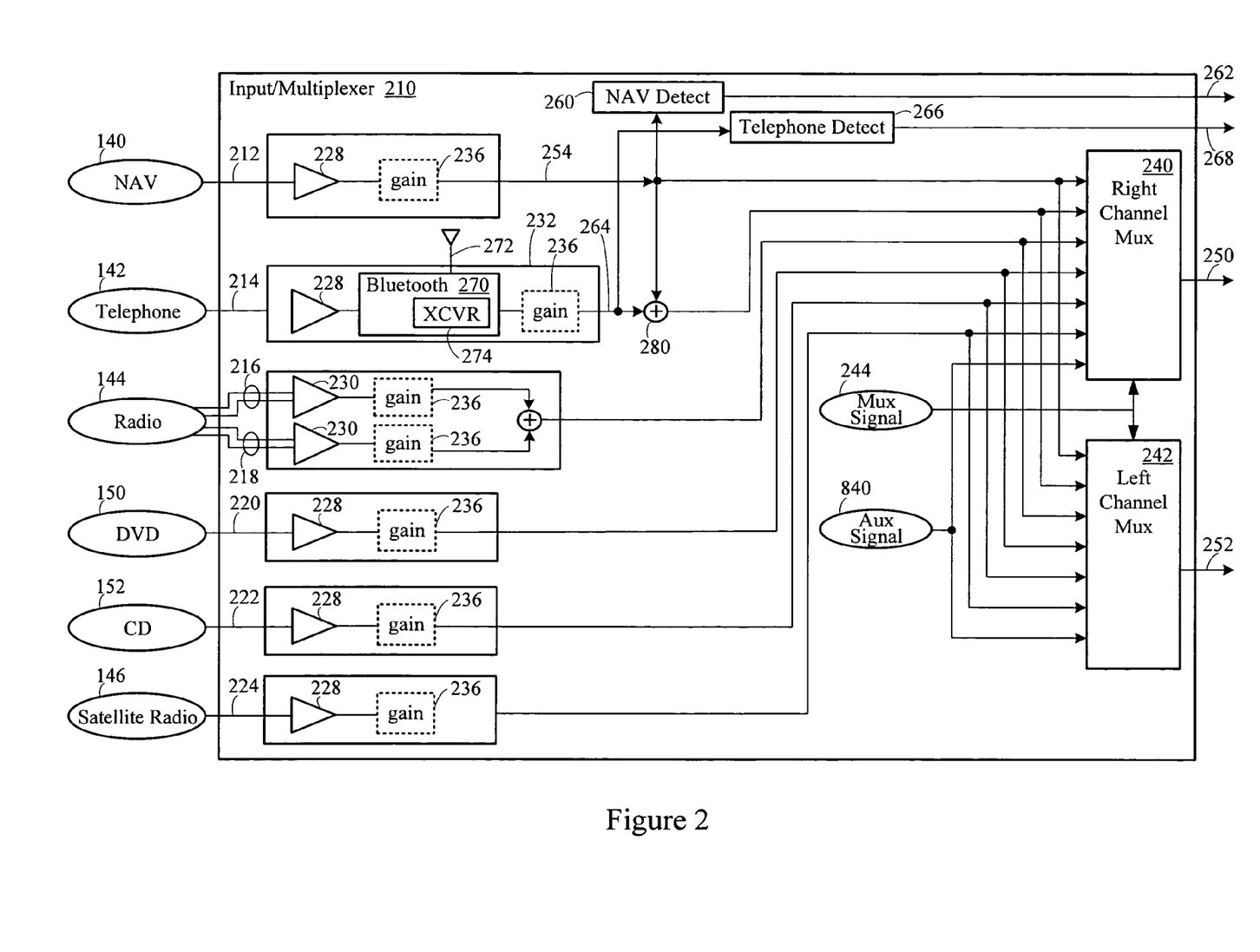
FIG. 2 shows an input/multiplexer portion of the audio control system.

A buffer amplifier 228 or pre-amplifier may receive the input from each of the inputs, respectively. Each buffer amplifier 228 may be an operational amplifier. A gain adjustment circuit 236 may receive output from some or all of the respective buffer amplifiers 228, and is thus shown in dashed lines. Note that each of the radio inputs 216 and 218 may be differential inputs. Accordingly, the corresponding buffer amplifier 230 for the radio inputs 216 and 218 may be arranged with a differential input. The differential inputs may reduce noise and increase signal quality. Some or all of the inputs and corresponding buffer amplifiers 228 and 230 may be arranged in a differential configuration.

The volume processor 160 may be programmed to control the respective gain adjustment circuits 236 to establish an appropriate input level for each corresponding audio source device 136. For example, the gain adjustment circuit 236 for the navigation input may be programmed to receive a signal in the range of about 100 millivolts to about 16 volts. The gain corresponding to each input may be individually programmed depending on the expected output levels of the various audio source devices 136.

A right channel multiplexer 240 and a left channel multiplexer 242 may receive the output from each gain adjustment circuit 236 respectively, or from the corresponding buffer amplifier 228 and 230 if no gain adjustment circuit is present. The right and left channel multiplexers 240 and 242 may be linear or analog multiplexers. The output of certain buffer amplifiers 228 or gain adjustment circuits 236 may be routed through additional pre-conditioning circuitry prior to routing to the multiplexers 240 and 242. The volume processor 160 may receive a right channel audio output signal 250 from the right channel multiplexer 240, and may receive a left channel audio output signal 252 from the left channel multiplexer 242. The volume processor 160 may control switching of the multiplexers 240 and 242 through a multiplexer control signal 244.

Some of the inputs corresponding to the respective audio source devices 136 may be prioritized. For example, the navigation input 212 and the telephone input 214 may have a higher priority than the other inputs. If the audio control system 110 detects an audio signal originating from the navigation input 212, the navigation input may receive priority over all of the other inputs. Accordingly, if the radio 144 or CD player 152 is operating, and a signal from the navigation system 140 becomes active, the audio control system 110 may control the right and left channel multiplexers 240 and 242 to immediately switch the navigation system input 212 through the multiplexers and to the volume processor. The navigation input 212 may be assigned a highest priority so that the user will not fail to hear an audio navigation prompt. Thus, the navigation input 212 may "interrupt" or deselect all other inputs, regardless of which input is in use at the time.

A navigation signal detection circuit 260 may receive an output 254 from the amplifier 228 or the gain adjustment circuit 236 corresponding to the navigation input 212 to determine if a navigation device signal is present. The navigation signal detection circuit 260 may issue a navigation detection signal 262 to inform the control processor 162 if a navigation signal is present on the navigation input 212. The user may also select the navigation source 140 manually or through voice-command or other telemetric-based device linked to the display module 122.

If a signal on the navigation input 212 caused de-selection of another audio signal, the navigation detection circuit 260 may also detect when the navigation signal has terminated, and may restore the deselected audio signal. The navigation detection circuit 260 may delay restoration of the interrupted signal so as to make a smooth transition during switching. Such a delay may be, for example, about one to about two seconds.

The wireless telephone input 214 may be assigned to a second highest priority. Accordingly, receipt of a cellular or wireless telephone audio signal on the telephone input 214 may deselect all other sources in use, except for the navigation source 140. In this way, the radio 144, the CD player 152 or other audio source devices 136 may be deselected when the user receives a telephone call.

A telephone detection circuit 266 may receive a telephone output signal 264 from the respective buffer amplifier 228 (or gain adjustment circuit 236) corresponding to the telephone input 214, and determine if a wireless telephone signal is present. The telephone detection circuit 266 may issue a telephone detection signal 268 to inform the control processor 162 that the telephone signal is present on the telephone input 214. The user may also select the telephone source 142 manually or automatically through voice-command or through a telemetric-based device linked to the display module 122.

A short-range wireless decoder 270, such as a Bluetooth® decoder, may couple the telephone input 214 to the multiplexers 240 and 242 to link the telephone 142. The decoder 270 may include an antenna 272 and wireless transceiver circuit 274 configured to receive short-range radio signals. Various wireless telephone devices may be used, such as a Bluetooth® enabled cellular telephone. Other short-range cable-free decoders may be in communication with certain unallocated input sources to accommodate high-fidelity audio signals. Some of the decoders may be Bluetooth® decoders, such as an A2DP (advanced audio distribution protocol) decoder.

A telephone detection circuit 266 may receive a telephone output signal. 264 from the respective buffer amplifier 228 (or gain adjustment circuit 236) corresponding to the telephone input 214, and determine if a wireless telephone signal is present. The telephone detection circuit 266 may issue a telephone detection signal 268 to inform the control processor 162 that the telephone signal is present on the telephone input 214. The user may also select the telephone source 142 manually or automatically through voice-command or through a telemetric-based device linked to the display module 122.

Alternatively, priority levels between some of the inputs may be reassigned under software control. The user may reprogram the priority levels by selecting the appropriate function using the volume control 130 or input control 132. Additional signal detection circuits similar to the navigation detection circuit 260 may be provided. Signals provided to and from the additional signal detection circuits may be re-routed using transmission gates or mechanical relays, such as a reed relay, when the priority levels are modified under software control so as to maintain a correspondence with the priority input to which it is associated. Accordingly, the user may have complete control over which input source device 136 is selected via the input control 132 located on the display module 122. Thus, the user may chose between the various input sources.

A signal summing circuit 280 may combine the telephone audio output signal 264 and the navigation audio output signal 254 to provide a summed signal. The signal summing circuit 280 may be an operational amplifier arranged in a summing configuration. This may permit the user to hear both audio signals so that the user does not miss the navigation information or a telephone call.

Figure 3:
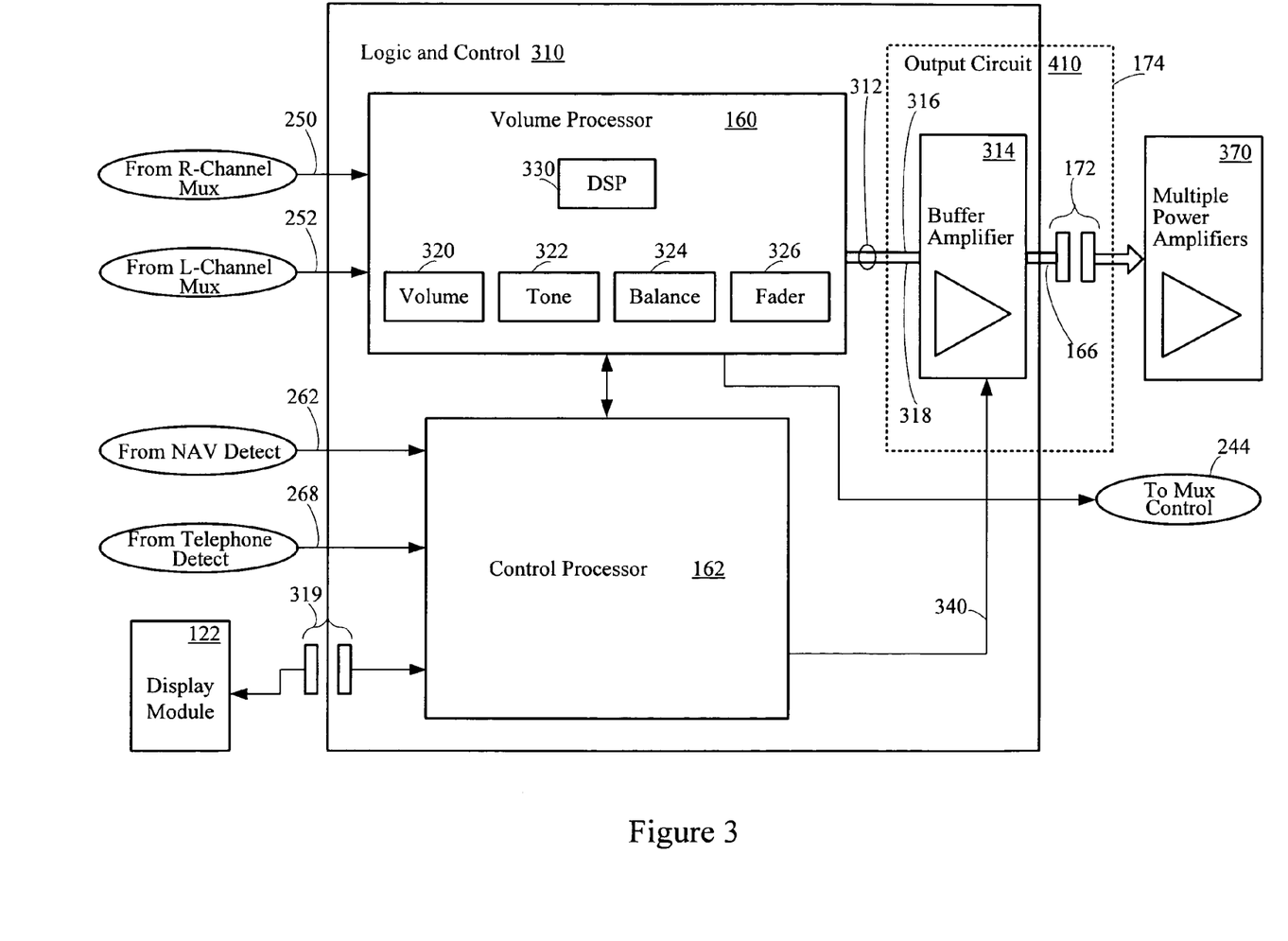
FIG. 3 shows a logic and control portion of the audio control system.

FIG. 3 shows a logic and control portion 310 of the input module 124. The volume processor 160 may receive the right channel audio signal 250 and the left channel audio signal 252 from the respective multiplexers 240 and 242. The volume processor 160 may process the left and right channel audio signals 250 and 252 and route conditioned output signals 312 to a plurality of output buffer amplifiers 314. The conditioned output signals 312 may include a right channel output signal 316 and a left channel output signal 318. The output buffer amplifiers 314 may be operational amplifiers arranged in a unity gain configuration, or may provide a predetermined amount of gain. The output buffer amplifiers 314 may be configured to isolate and prevent damage to the circuitry should the output signals 166 to the power amplifiers 370 become short-circuited.

A connector arrangement or jack 319 may couple the control processor 162 to the display module 122 using a minimal number of wires. A standard DIN type connector may be used. A serial communication format may be used to minimize the number of wires.

FIG. 3 shows a logic and control portion 310 of the input module 124. The volume processor 160 may receive the right channel audio signal 250 and the left channel audio signal 252 from the respective multiplexers 240 and 242. The volume processor 160 may process the left and right channel audio signals 250 and 252 and route conditioned output signals 312 to a plurality of output buffer amplifiers 314. The conditioned output signals 312 may include a right channel output signal 316 and a left channel output signal 318. The output buffer amplifiers 314 may be operational amplifiers arranged in a unity gain' configuration, or may provide a predetermined amount of gain. The output buffer amplifiers 314 may be configured to isolate and prevent damage to the circuitry should the output signals 166 to the power amplifiers 370 become short-circuited.

The control processor 162 may communicate with the volume processor 160 and may also receive the navigation detection signal 262 and the telephone detection signal 268. The control processor 162 may effect control of the navigation input 212 and the telephone input 214 to interrupt other source devices 136 in a priority-mode state. The control processor 162 may also provide a mute control signal 340 to the output buffer amplifiers 314.

Figure 4:
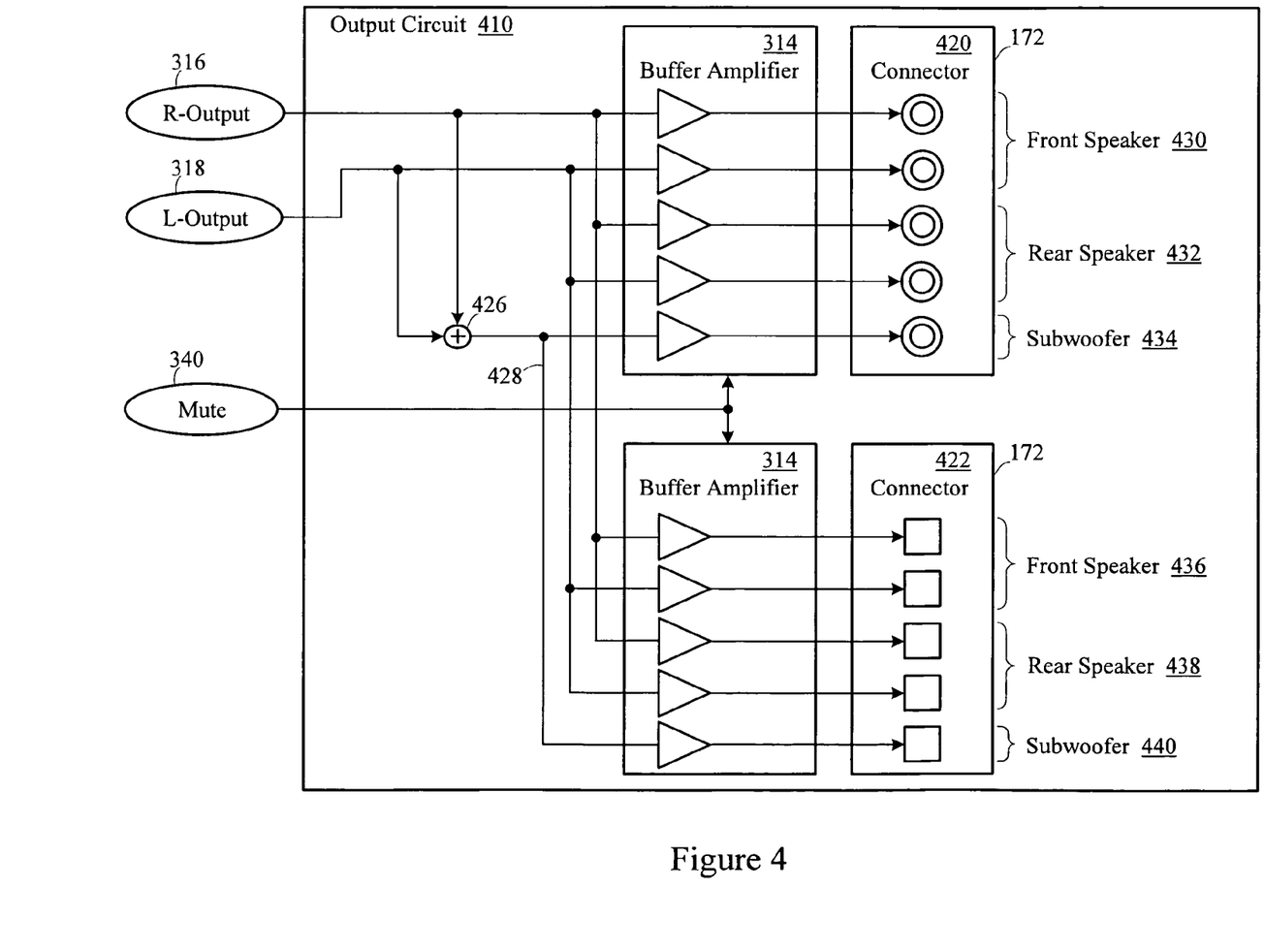
FIG. 4 shows an output circuit of the audio control system.
Figure 5:
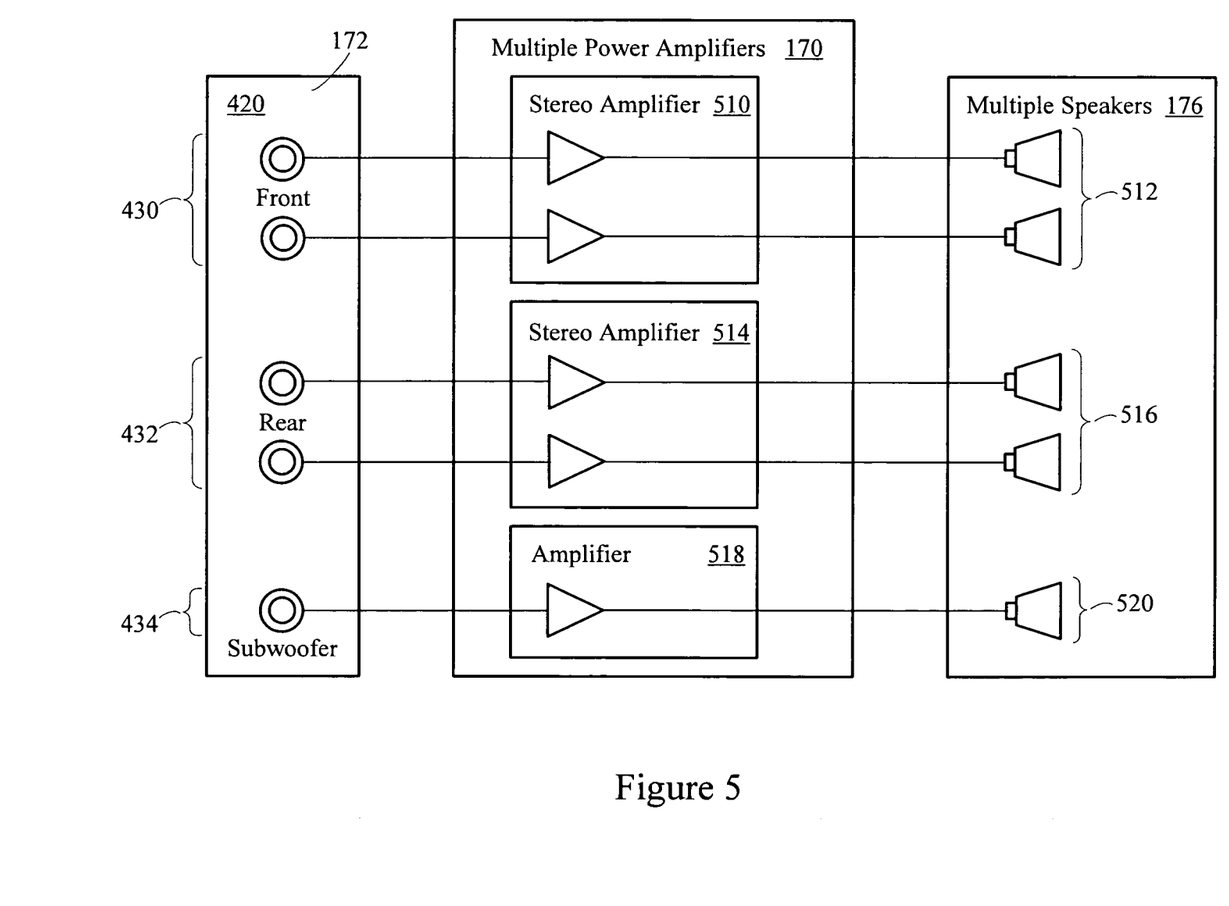
FIG. 5 shows a three-way amplifier configuration.

FIG. 4 shows additional details of an output circuit 410, which may include the output buffer amplifiers 314 and the output connector blocks 172. The output connector blocks 172 may include dual output jack configurations in the form of RCA-type connectors 420 and RJ45-type connectors 422. Multiple output jacks 420 and 422 may provide universal connectivity. Any number of connectors may be used in alternative systems. The output jacks 420 and 422 may route the audio output signals 166 to the multiple power amplifiers 170. The multiple power amplifiers 170 may be located remote from the controller (e.g., in the trunk of the vehicle).

A sub-woofer summing circuit 426 may combine or sum the right channel audio output signal 316 and the left channel audio output signal 318 from the volume processor 160 to generate a monaural subwoofer audio signal 428. The sub-woofer summing circuit 426 may be an operational amplifier arranged in a summing configuration.

FIG. 4 shows additional details of an output circuit 410, which may include the output buffer amplifiers 314 and the output connector blocks 172. The output connector blocks 172 may include dual output jack configurations in the form of RCA-type connectors 420 and RJ45-type connectors 422. Multiple output jacks 420 and 422 may provide universal connectivity. Any number of connectors may be used in alternative systems. The output jacks 420 and 422 may route the audio output signals 166 to the multiple power amplifiers 170. The multiple power amplifiers 170 may be located remote from the controller (e.g., in the trunk of the vehicle).

A sub-woofer summing circuit 426 may combine or sum the right channel audio output signal . 316 and the left channel audio output signal 318 from the volume processor 160 to generate a monaural subwoofer audio signal 428. The sub-woofer summing circuit 426 may be an operational amplifier arranged in a summing configuration.

The multiple RCA-type connectors 420 may include front speaker connectors 430, rear speaker connectors 432 and a subwoofer connector 434. Corresponding signals are provided to the RJ45-type connectors 422, which may include front speaker connectors 436, rear speaker connectors 438 and a subwoofer connector 440. The RCA-type connectors 420 and the RJ45-type connectors 422 may be functionally equivalent.

Figure 7:
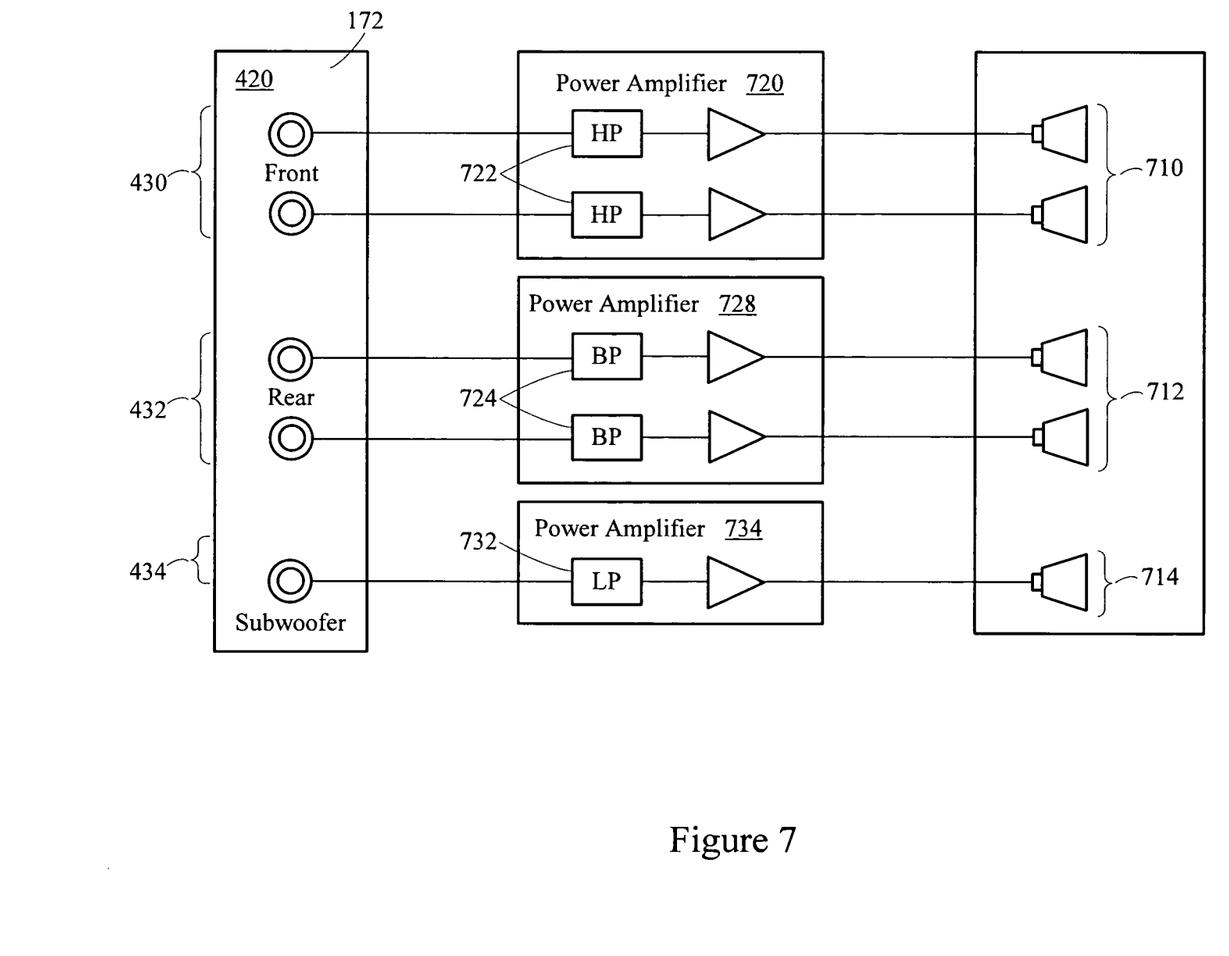
FIG. 7 shows a bi-amplified amplifier configuration.

FIG. 7 shows an alternative bi-amplified five-channel configuration. The front speakers may be bi-amplified such that there may be separate amplifiers for tweeters 710, mid-range speakers 712 and a subwoofer speaker 714. The bi-amplified configuration may include a first stereo power amplifier 720 that may drive the tweeters 710. Because no crossover circuitry is provided in the loud speakers, a high-pass filter or crossover circuit 722 may connect the front input connectors 430 to the first stereo power amplifier 720 to provide the high-frequency audio signals. Similarly, a band-pass filter or crossover circuit 724 may connect the rear input connectors 432 to a second stereo power amplifier 728 to provide the midrange audio signals. Finally, a low-pass filter or crossover circuit 732 may connect the rear input connectors 434 to a third power amplifier 734 to provide the subwoofer audio signals. The amplifiers may be configured to provide LOGIC7 Surround Sound (trademark of Lexicon Corp., a division of Harman Specialty Group of Massachusetts). The power amplifiers may be Class-D power amplifiers.

Figure 6:
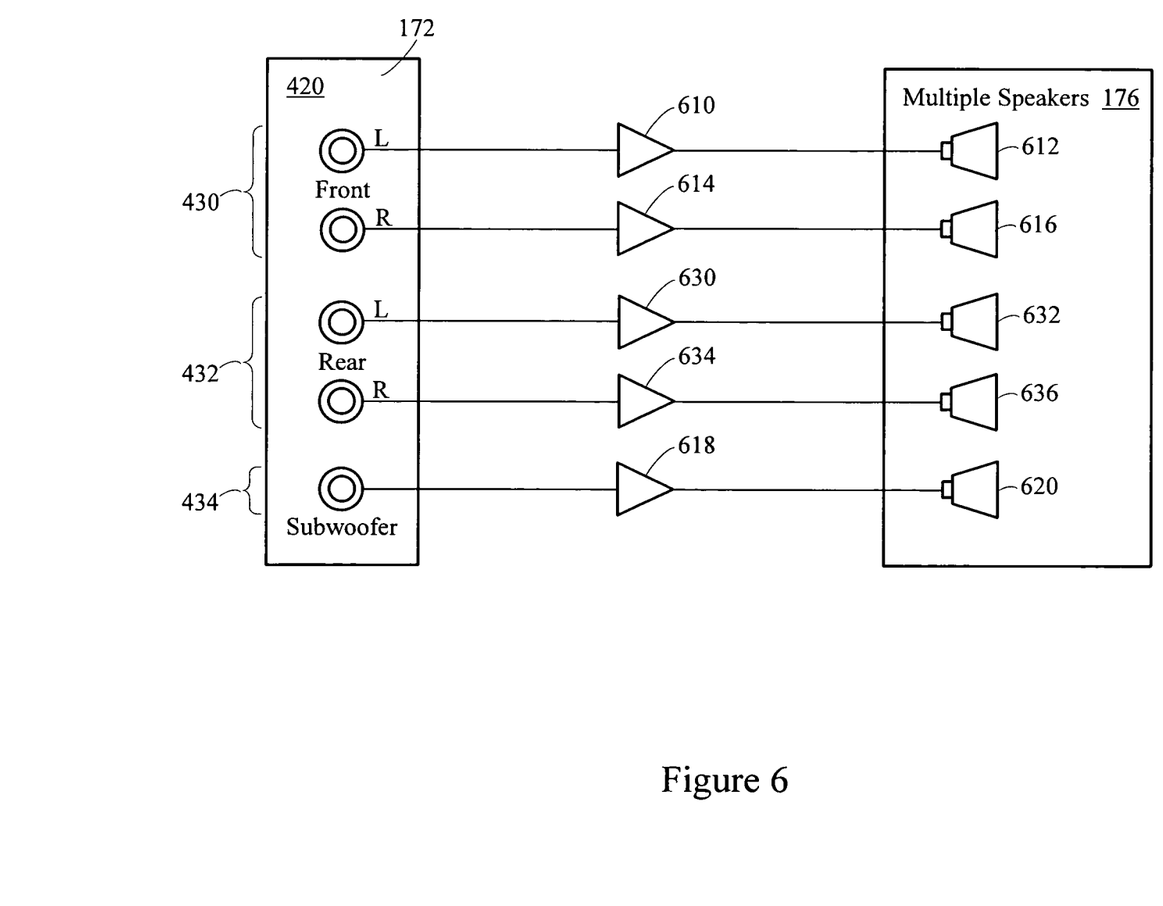
FIG. 6 shows a five-way amplifier configuration.

FIG. 6 shows a five-channel amplifier configuration. Only the five RCA-type connectors 420 are shown to avoid duplication. A five channel configuration may include a first power, amplifier 610 that may drive a front left-side speaker 612, a second power amplifier 614 that may drive a front right-side speaker 616, and a third power amplifier 618, that may drive a subwoofer speaker 620. Additionally, a fourth power amplifier 630 may drive a rear left-side speaker 632, and a fifth power amplifier 634 may drive a rear right-side speaker 636.

Figure 8:
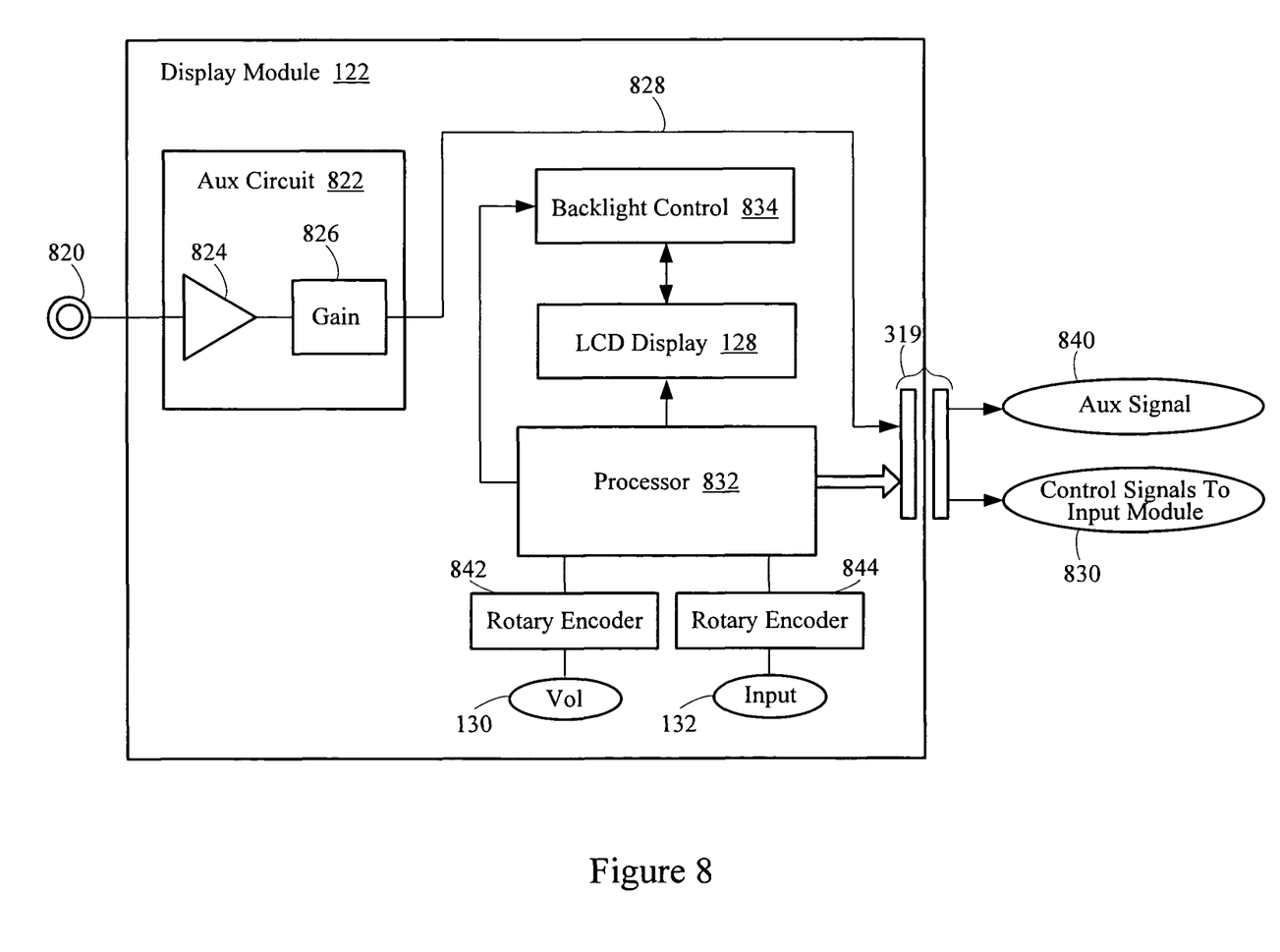
FIG. 8 shows a display module of the audio control system.

A single harness, such as the DIN-type cable or connector 319, may connect the display module 122 and the input module 124. The display module 122 and the input module 124 may communicate using various command and control signals 830 transmitted through the connector 319. The display module 122 may include a separate microprocessor 832 and a backlighting circuit 834. The display module 122, including the LCD display 128, may receive power from the power supply located in the input module. Alternatively, the display module 122 may connect to the input module 124 wirelessly so as to eliminate the DIN-type cable and connector 319. In such a configuration, the input module 122 may receive power from an internal battery, or vehicle power bus, or another source.

A first rotary encoder 842 may receive input from the volume control 130 of the display module 122. A second rotary encoder 844 may receive input from the input control 132 of the display module 122. The encoded information may be transmitted to the control processor 162 of the input module 124 via serial lines through the connector 319. The rotary encoders 842 and 844 may additionally provide push and hold notification corresponding to depression and holding of the corresponding controls 130 and 132.

Figure 9:
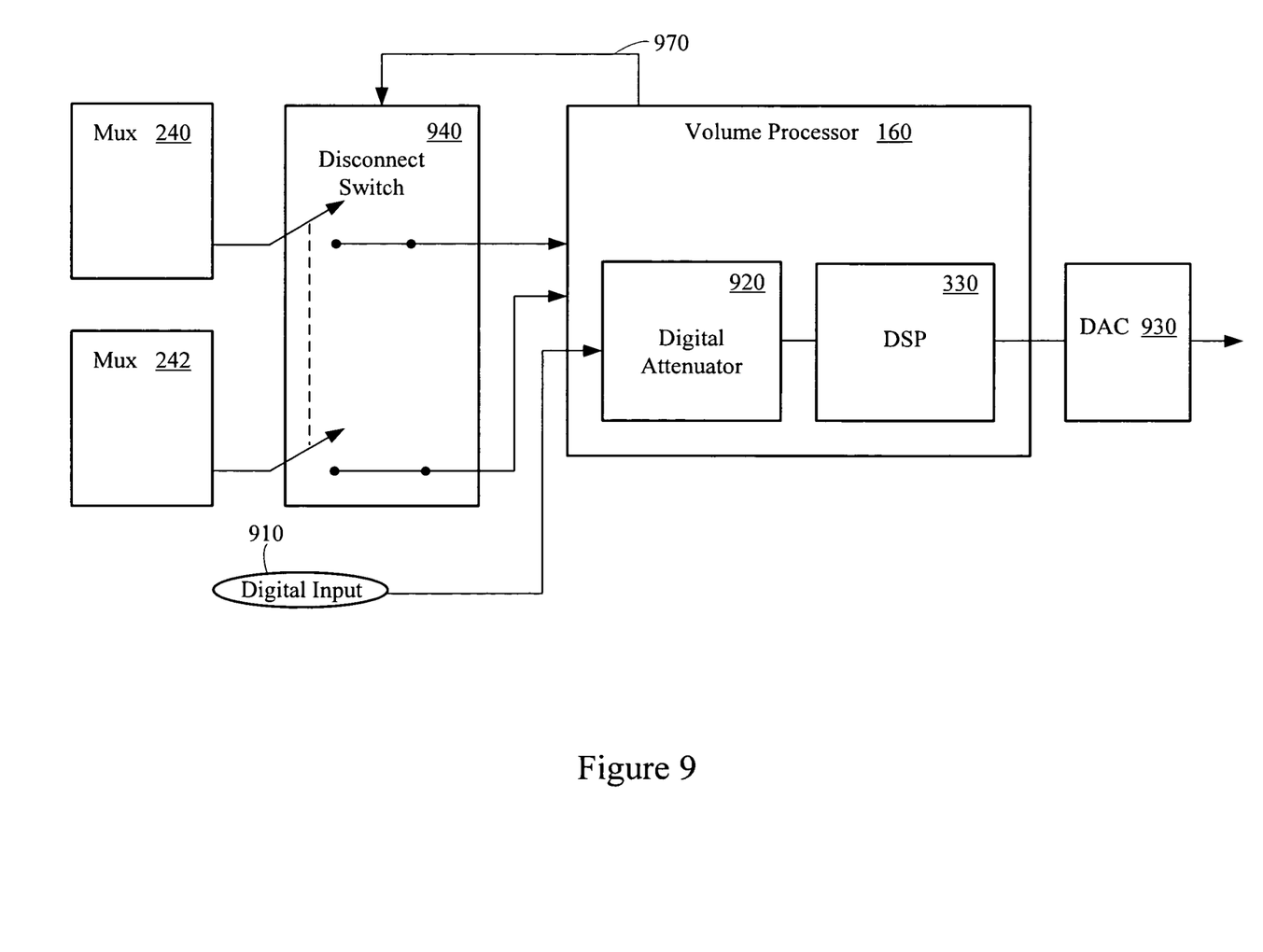
FIG. 9 shows additional features of the audio control system.

FIG. 9 shows an alternate arrangement that may include an eighth input 910 ("digital input"), which may receive digital audio signals from a digital device, such as from a DVD player. Again, although a single line may be shown in FIG. 9, the digital signal may be a stereo signal, including left and right channel signals. The configuration of FIG. 9 may include the components shown in FIGS. 2 and 3, where and like-referenced numbers are used to denote the same or similar components. For clarity, other components of FIGS. 2 and 3 are not duplicated.

A first rotary encoder 842 may receive input from the volume control 130 of the display module 122. A second rotary encoder 844 may receive input from the input control 132 of the display module 122. The encoded information may be transmitted to the control processor 162 of the input module 124 via serial lines through the connector 319. The rotary encoders 842 and 844 may additionally provide push and hold notification corresponding to depression and holding of the corresponding controls 130 and 132.

Figure 10:
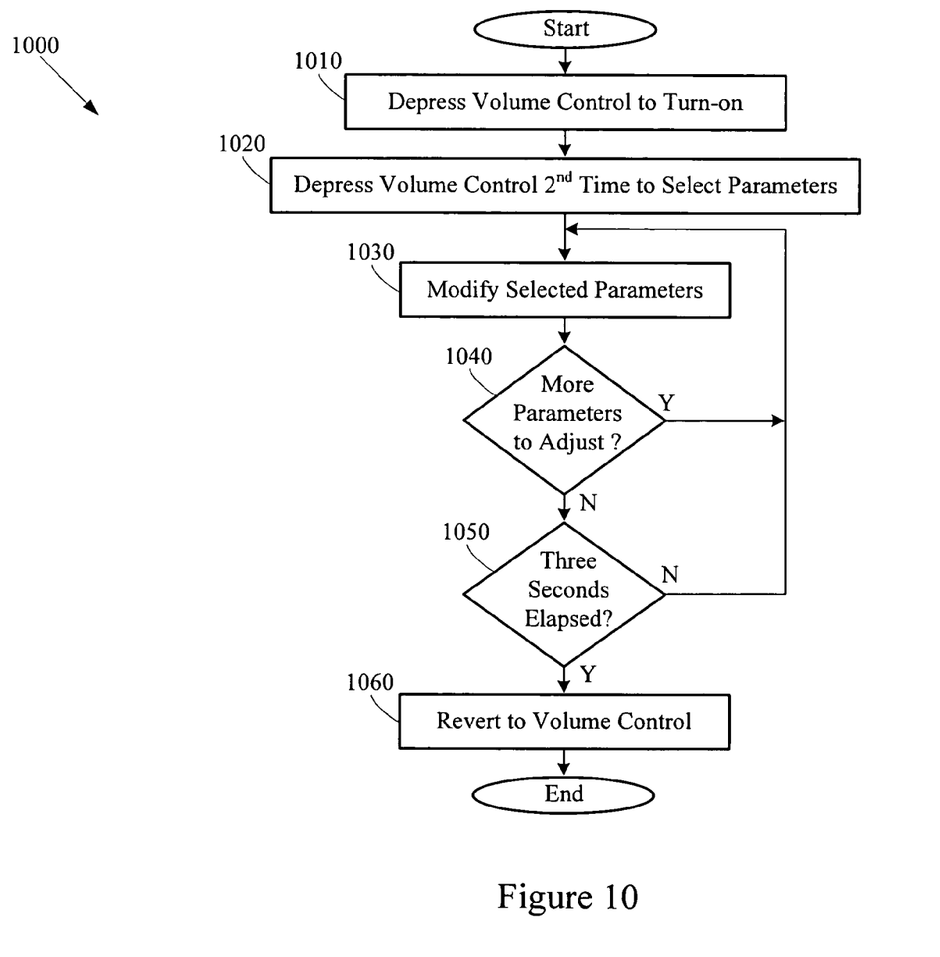
FIG. 10 is a flow diagram showing operation of the audio control system.

FIG. 10 is a flow diagram showing acts 1000 that may be taken during operation of the audio control system 110. The user may depress or push in the volume control 130 to turn-on (Act 1010) the audio control system 110. The user may depress or push in the volume control 130 a second time (Act 1020) to access the tone, balance, and fader parameters. Turning the volume control in a clockwise or counter-clockwise direction (Act 1030) may change the selected parameter. If additional parameters require changing (Act 1040), the user may push the volume control and modify the selected parameter. After a predetermined period of time, for example about three seconds (Act 1050), if the volume control 130 is not depressed, the audio control system 110 may revert back to a volume control mode (Act 1060).

The logic, circuitry, and processing described above may be encoded in a computer-readable medium such as a CDROM, disk, flash memory, RAM or ROM, an electromagnetic signal, or other machine-readable medium as instructions for execution by a processor or controller. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory, or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds), and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular or wireless phone, a headset, a hands-free set, a speakerphone, communication interface, or an infotainment system.

The audio control system 110 may manage and switch multiple audio sources. The control system may receive audio source input from existing OEM provided devices 136, such as the radio and CD player. The control system 110 may also receive audio source input from additional audio sources, such as navigation systems 140, cellular or wireless telephones 142, satellite radios 146, MP3-based players 148, DVD players 150 etc. The control system 110 may be an aftermarket or "add-on" system. Accordingly, removal or replacement of the OEM provided devices may be obviated, which may preserve the cosmetic appearance of the dashboard. Certain audio input sources may be prioritized such that audio signals from a high priority device, such as a navigation system or wireless telephone, may interrupt audio signals from lower priority devices.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An audio control system for managing a plurality of audio source devices, the system comprising:
    a plurality of audio input signals, at least one of the audio input signals corresponding to a priority audio source device;
    a gain adjustment circuit that receives at least one of the audio input signals and is configured to adjust gain for the at least one audio input signal received;
    a switching circuit configured to select one of the plurality of audio input signals and switch the selected signal from the respective audio source devices through the switching circuit, wherein the switching circuit further comprises a right channel multiplexer and a left channel multiplexer in communication with a volume processor, the volume processor receives a right channel audio output signal from the right channel multiplexer and a left channel audio output signal from the left channel multiplexer;

a controller in communication with the switching circuit to control switching of the switching circuit and in communication with the gain adjustment circuit to selectively establish an input level for at least one of the audio input signals;

a signal detector in communication with at least one of the audio input signals and configured to detect presence of a signal from the priority audio source device;

the controller directing the switching circuit to deselect an existing input and select an audio input signal corresponding to the priority audio source device when the signal from the priority audio source device is detected; and a display module having an associated input control, the controller in communication with the display module and input control to provide reprogramming of priority levels associated with the audio input signals via user selection of the input control associated with the display module, wherein the plurality of audio input signals include a telephone audio signal transmitted from a cellular telephone and a navigation audio signal transmitted from a navigation system;

wherein the switching circuit further includes a summing circuit for summing the telephone audio signal and the navigation audio signal to generate a summed signal that permits a user to receive first data on the telephone audio signal and second data on the navigation audio signal, and wherein the controller is configured to interrupt at least one first audio source device that transmits a first audio input signal and to prevent transmission of the first audio input signal if the first audio input signal does not correspond to one of the telephone audio signal and the navigation audio signal for enabling the user to receive the first data on the telephone audio signal and the second data on the navigation audio signal without interruption from the first audio input signal.

2. The system according to claim 1 comprising a second signal detector configured to detect presence of a signal from a second priority audio source device, where the controller directs the switching circuit to deselect an existing audio input and select an audio input signal corresponding to the second priority audio source device, when a signal from the second priority audio source device is detected.

3. The system according to claim 2, where if a selected audio input signal corresponds to the priority audio source device, the controller does not deselect the selected input when a signal from the second priority audio source device is detected.

4. The system according to claim 2, where the controller changes a relative priority level of the priority audio source device and the second priority audio source device.

5. The system according to claim 1 comprising a display in communication with the controller, configured to provide information regarding switching of the audio input signals.

6. The system according to claim 1 comprising a user interface in communication with the controller configured to permit manual selection and switching of the audio input source through the switching circuit.

7. The system according to claim 1 comprising a wireless decoder circuit configured to transmit audio signals to the switching circuit.

8. An audio control system for managing a plurality of audio source devices, the system comprising:

a plurality of audio input signals, at least one of the audio input signals corresponding to a priority audio source device;

a gain adjustment means that receives at least one of the audio input signals and is configured to adjust gain for the at least one audio input signal received;

switching means configured to select one of the plurality of audio input signals and switch the selected signal from the respective audio source devices through the switching means, wherein the switching means further comprises a right channel multiplexer and a left channel multiplexer in communication with a volume processor, the volume processor receives a right channel audio output signal from the right channel multiplexer and a left channel audio output signal from the left channel multiplexer;

control means in communication with the switching means to control, switching of the switching means and in communication with the gain adjustment means to selectively establish an input level for at least one of the audio input signals;

signal detection means in communication with at least one of the audio input signals and configured to detect presence of a signal from the priority audio source device;

the control means directing the switching means to deselect an existing input and select an audio input signal corresponding to the priority audio source device when the signal from the priority audio source device is detected; and a display module having an associated input control, the control means in communication, with the display module and input control to provide reprogramming of priority levels associated with the audio input signals via user selection of the input control associated with the display module, wherein the plurality of audio input signals include a telephone audio signal transmitted from a cellular telephone and a navigation audio signal transmitted from a navigation system;

wherein the switching circuit further includes a summing circuit for summing the telephone audio signal and the navigation audio signal to generate a summed signal that permits a user to receive first data on the telephone audio signal and second data on the navigation audio signal; and wherein the controller is configured to interrupt at least one first audio source device that transmits a first audio input signal and to prevent transmission of the first audio input signal if the first audio input signal does not correspond to one of the telephone audio signal and the navigation audio signal for enabling the user to receive the first data on the telephone audio signal and the second data on the navigation audio signal without interruption from the first audio input signal.

9. An audio control system for controlling a plurality of audio sources, the system comprising:

a plurality of audio input signals, at least one of the audio input signals corresponding to a priority audio source device;

a gain adjustment circuit that receives at least one of the audio input signals and is configured to adjust gain for the at least one audio input signal received;

a switching circuit configured to select one of the plurality of audio input signals, and switch the selected signal from the respective audio source device to an amplifier, wherein the switching circuit further comprises a right channel multiplexer and a left channel multiplexer in communication with a volume processor, the volume processor receives a right channel audio output signal from the right channel multiplexer and a left channel audio output signal from the left channel multiplexer;

a controller in communication with the switching circuit to control switching of the switching circuit and in communication with the gain adjustment circuit to selectively establish an input level for at least one of the audio input signals;

a display in communication with the controller and configured to provide information regarding switching of the audio input signals;

a user interface configured to permit manual switching of the audio input signals;

a signal detector in communication with at least one of the audio input signals configured to detect presence of a signal from a priority audio source device;

the controller directing the switching circuit to deselect an existing input and select an audio input signal corresponding to the priority audio source device when the signal from the priority audio source device is detected; and a display module having an associated input control, the controller in communication with the display module and input control to provide reprogramming of priority levels associated with the audio input signals via user selection of the input control associated with the display module, wherein the plurality of audio input signals include a telephone audio signal transmitted from a cellular telephone and a navigation audio signal transmitted from a navigation system;

wherein the switching circuit further includes a summing circuit for summing the telephone audio signal and the navigation audio signal to generate a summed signal that permits a user to receive first data on the telephone audio signal and second data on the navigation audio signal; and wherein the controller is configured to interrupt at least one first audio source device that transmits a first audio input signal and to prevent transmission of the first audio input signal if the at least one audio device does not correspond to one of the telephone audio signal and the navigation audio signal for enabling the user to receive the first data on the telephone audio signal and the second data on the navigation audio signal without interruption from the first audio input signal.

10. The system according to claim 9 comprising a second signal detector configured to detect presence of a signal from a second priority audio source device, where the controller directs the switching circuit to deselect an existing audio input and select an audio input signal corresponding to the second priority audio source device when a signal from the second priority audio source device is detected.

11. The system according to claim 10, where if a selected audio input signal corresponds to the priority audio source device, the controller does not deselect the selected input when a signal from the second priority audio source device is detected.

12. The system according to claim 11, where the controller changes a relative priority level of the priority audio source device and the second priority audio source device.

13. The system according to claim 9 comprising a wireless decoder circuit configured to transmit audio signals to the switching circuit.

14. A method of managing a plurality of audio sources comprising;
receiving a plurality of audio input signals, at least one of the audio input signals corresponding to a priority audio source device;
selectively adjusting gain of at least one of the audio input signals to establish an input level for the at least one audio input signal;
selecting one of the plurality of audio input signals from respective audio sources and switching the selected signal into communication with an amplifier;
sending a right channel audio output signal from a right channel multiplexer to a volume processor and sending a left channel audio output signal from a left channel multiplexer to the volume processor;
displaying information regarding switching of the audio signal inputs; detecting presence of a priority audio input signal;
deselecting an existing audio input signal, reselecting the priority audio input signal, and switching the reselected signal into communication with the amplifier, when the priority audio signal is detected;
reprogramming priority levels associated with the audio input signals in response to user selection of displayed functions via an input control;
summing a telephone audio signal transmitted from a cellular telephone and a navigation audio signal transmitted from a navigation system to generate a summed signal that permits a user to receive first data on the telephone audio signal and second data on the navigation audio signal, the plurality of output signals include the telephone audio signal and the navigation audio signal; and
interrupting at least one first audio source device that transmits a first audio input signal and preventing transmission of the first audio input signal if the first audio input signal does not correspond to one of the telephone audio signal and the navigation audio signal for enabling the user to receive the first data on the telephone audio signal and the second data on the navigation audio signal without interruption from the first audio input signal.

15. The method according to claim 14 comprising:
detecting presence of a second priority audio input signal; and
when the signal from the second priority audio source device is detected then deselecting an existing audio input signal;
reselecting the second priority audio input signal; and
switching the reselected signal into communication with the amplifier.

16. The method according to claim 15, where if a the priority audio input signal is selected, the priority audio input signal is not deselected when the second priority audio signal is detected.

* * * * *